(12) United States Patent
Meynard

(10) Patent No.: US 7,062,663 B2
(45) Date of Patent: Jun. 13, 2006

(54) VOLTAGE REGULATION IN AN INTEGRATED CIRCUIT

(75) Inventor: Olivier Meynard, Vizille (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 686 days.

(21) Appl. No.: 09/887,753

(22) Filed: Jun. 22, 2001

(65) Prior Publication Data
US 2002/0019949 A1 Feb. 14, 2002

(30) Foreign Application Priority Data
Jul. 24, 2000 (EP) .................................. 00410079

(51) Int. Cl.
*G06F 13/14* (2006.01)

(52) U.S. Cl. ...................... 713/320; 713/322; 713/323; 713/324; 713/330; 713/340

(58) Field of Classification Search ................ 713/300, 713/322–324, 330, 340, 320; 375/233, 285
See application file for complete search history.

(56) References Cited

U.S. PATENT DOCUMENTS

| | | | | |
|---|---|---|---|---|
| 4,049,326 A | * | 9/1977 | Zobel .................... 303/122.07 |
| 5,396,635 A | | 3/1995 | Fung .......................... 395/800 |
| 5,590,061 A | * | 12/1996 | Hollowell et al. ............ 702/130 |
| 5,737,614 A | * | 4/1998 | Durham et al. .............. 713/322 |
| 5,751,603 A | | 5/1998 | Landolf ....................... 364/492 |
| 5,754,436 A | | 5/1998 | Walsh et al. ................. 364/483 |
| 5,812,860 A | | 9/1998 | Horden et al. ......... 395/750.04 |
| 5,974,557 A | * | 10/1999 | Thomas et al. .............. 713/322 |
| 5,987,615 A | | 11/1999 | Danstrom ................... 713/300 |
| 6,000,036 A | * | 12/1999 | Durham et al. ............. 713/320 |
| 6,002,340 A | | 12/1999 | Smith ..................... 340/825.06 |
| 6,047,248 A | * | 4/2000 | Georgiou et al. ........... 702/132 |
| 6,075,932 A | * | 6/2000 | Khouja et al. ................. 716/4 |
| 6,091,255 A | * | 7/2000 | Godfrey ..................... 324/760 |
| 6,108,419 A | * | 8/2000 | LaMacchia et al. ........... 380/2 |
| 6,118,334 A | * | 9/2000 | Tanaka et al. ............... 327/565 |
| 6,125,334 A | * | 9/2000 | Hurd ............................ 702/60 |
| 6,219,796 B1 | * | 4/2001 | Bartley ....................... 713/320 |
| 6,313,622 B1 | * | 11/2001 | Seki et al. ................ 324/76.82 |
| 6,393,374 B1 | * | 5/2002 | Rankin et al. .............. 702/132 |
| 6,415,388 B1 | * | 7/2002 | Browning et al. .......... 713/322 |
| 6,459,581 B1 | * | 10/2002 | Newton et al. ............. 361/700 |
| 6,459,746 B1 | * | 10/2002 | Agazzi et al. .............. 375/371 |
| 6,463,396 B1 | * | 10/2002 | Nishigaki .................... 702/132 |
| 6,477,200 B1 | * | 11/2002 | Agazzi et al. .............. 375/233 |
| 6,487,668 B1 | * | 11/2002 | Thomas et al. ............. 713/322 |
| 6,593,765 B1 | * | 7/2003 | Ishida et al. ................ 324/765 |
| 6,701,273 B1 | * | 3/2004 | Nishigaki et al. .......... 702/132 |
| 6,775,531 B1 | * | 8/2004 | Kaewell et al. .......... 455/343.1 |

FOREIGN PATENT DOCUMENTS

| | | |
|---|---|---|
| EP | 0 632 360 | 1/1995 |
| EP | 0 713 169 | 5/1996 |
| WO | 00/26747 | 5/2000 |

* cited by examiner

*Primary Examiner*—A. Elamin

(57) ABSTRACT

The invention relates to power regulation of integrated circuits such as microprocessors. It suggests measuring instantaneous power consumption inside of the integrated circuit (13), by sensing state changes of the transistors of the units (14, 16, 18 20, 22) of the circuit. Based on the sensed power consumption, an instantaneous power consumption for the whole circuit may be computed and transmitted to a voltage regulator (27). The voltage regulator changes the voltage according to the computed power consumption; the regulator may thus precompensate power surges, and limit voltage transients.

16 Claims, 2 Drawing Sheets

VOLTAGE REGULATION IN AN INTEGRATED CIRCUIT

The invention relates to integrated circuits, and more specifically to regulation of the voltage applied to these integrated circuits. It notably can be applied to microprocessors used in computers.

Integrated circuits, and notably microprocessors, comprise a great number of transistors formed by etching in various layers of silicon based materials. They have a variable power consumption, according to the task(s) carried out; it has been therefore suggested to use a voltage regulator to apply to an integrated circuit a voltage supplied by a voltage source. FIG. 1 is a schematic view of the prior art voltage supply to an integrated circuit; it shows a voltage supply 1, connected to an integrated circuit 3 through a voltage regulator 2. The purpose of the voltage regulator is to change the voltage applied to the integrated circuit, so as to comply with voltage transient specifications for the circuit.

FIG. 2 is a graph of voltage in an integrated circuit; it shows voltage as a function of time. In the example, the circuit is idle up to time t1, where it turns to internal full activity. Voltage across the circuit is substantially constant and equal to the idle voltage value Vidle up to time t2; after time t2, voltage drops sharply, causing a transient response of the voltage regulator up to time t3. Around t3, the voltage regulator starts compensating the voltage drop by providing a higher voltage. Voltage then increases until reaching a full activity voltage Vfullactivity, around time t4. The areas hashed in FIG. 2 show the violations of the voltage specification due to voltage transient values. The time duration between t2 and t3 is mainly determined by on-board decoupling and is in the 1-10 microsecond range. The difference between times t4 and t3 is around 10–20 microseconds for a 300 KHz switching regulator, and is representative of the time necessary to regulate the voltage so as to cause it to increase again.

Voltage transient specifications—that is the difference between upper and lower admitted values between which voltage across the circuit should be maintained—are becoming lower together with etching resolution. Values around 50 mV are expected in a near future. On the contrary, power consumption in integrated circuit increases with the size of the circuits. As speed increases and supply voltage decreases, current changes are steeper and steeper, and also have an increasing amplitude. Present current range is from 10 to 15 A, while values from 10 to 50 A are expected in a near future.

Thus, there is a need for a solution allowing voltage specification to be respected for integrated circuits, notwithstanding increasing consumption and reduced voltage transient specifications.

A first solution proposed in the prior art ( see for instance LTC1709 datasheet on www.linear-tech.com) is to increase the switching frequency of the voltage regulator, or the number of phases of the voltage regulator; indeed, the duration of a violation of voltage specification after a given current surge is representative of the time constant of the voltage regulator. This solution decreases the duration of violation of voltage specification when the current varies; however, it cannot address the issue of amplitude of the voltage surges. In addition, this solution increases the cost of the voltage regulator in the case of a multiphase system, and is limited by MOSFETS performance and cooling in the case of a single phase/high frequency regulator.

Another known solution—described for instance in application note 69 entitled "LT1575 Ultrafast Linear Controller Makes Fast Transient Response Power Supplies" from Linear Technology Corporation—is to use a better quality decoupling capacitor between the voltage regulator and the integrated circuit. The capacitors smoothen voltage surges whenever there is a change in the requested current. This solution reduces the amplitude of voltage variations; however, this solution also causes a problem of cost; in addition, capacitors require large circuit areas; since the capacitors, in order to be effective, should be located as near as possible to the integrated circuit, this solution is thus limited in effect.

Thus, there is a particular need for a simple and effective solution to the problem of voltage transient specifications in integrated circuits.

The invention provides a solution overcoming these problems. It provides a simple solution for limiting voltage transient specifications, while preserving space on the board near to the integrated circuit; in the case of microprocessors, the space on the motherboard near the microprocessor may then be used for purposes other than decoupling capacitors. The solution is also cost-effective, and does not substantially increase the cost of the voltage regulator. The solution of the invention is particularly adapted for high-speed and high power microprocessors; in this context, high speed should be construed as over 1000 MHz.

More specifically, the invention provides a process for regulating voltage applied by a voltage regulator to an integrated circuit, comprising the steps of:
  measuring instantaneous power consumption inside of the integrated circuit; and
  regulating said voltage according to the measured instantaneous power.

In one embodiment, in which the integrated circuit comprises at least two units, the step of measuring comprises sensing power consumption in at least two of said units, and computing instantaneous power consumption inside of the integrated circuit according to the sensed power consumption in said units. The step of sensing power consumption in a unit can, for instance, comprise detecting state changes in signals output by said unit.

In preferred embodiments, the step of computing comprises weighting the power consumption sensed in said units; and adding the weighted power consumption of said units.

The step of regulating can comprise computing the derivative with respect to time of the measured instantaneous power, and regulating said voltage according to said computed derivative.

In another aspect, the invention provides an integrated circuit comprising at least one unit provided with a sensor for measuring power consumption and a power calculation unit for receiving the power consumption measured by each of said sensors and computing a power consumption for the circuit.

In preferred embodiments, said power calculation unit computes power consumption for the circuit by weighting the power consumption measured by each of said sensors with weights; and by adding the weighted power consumption, and the weights are stored in said integrated circuits.

Such an integrated circuit operates in combination with a voltage regulator that is connected to said circuit and receiving the power consumption computed by power calculation unit.

An integrated circuit embodying the invention will now be described, by way of non-limiting example, and in reference to the accompanying drawings, where FIG. 1 is a schematic view of the prior art voltage supply to an integrated circuit;

The invention is described below in reference to a preferred embodiment, where it applies to microprocessors. It may of course equally be applied to other types of circuits.

According to the invention, instantaneous power consumption inside of the integrated circuit is measured, and the voltage regulator is driven according to the measured power consumption. It relies on the fact that instantaneous power consumption, as measured inside of the integrated circuit, will provide an estimate of the necessary voltage, even before this voltage is requested by the circuit. In other words, the invention takes advantage of the fact that a certain amount of time is necessary for a current surge to propagate inside an integrated circuit, from the transistors being switched at a given time, to the power plane of the integrated circuit; this delay is caused by local decoupling—smoothing effect—and by internal inductance inside the integrated circuit. Advantage is taken of this delay to warn the voltage regulator of the upcoming current surge.

Figure 3:
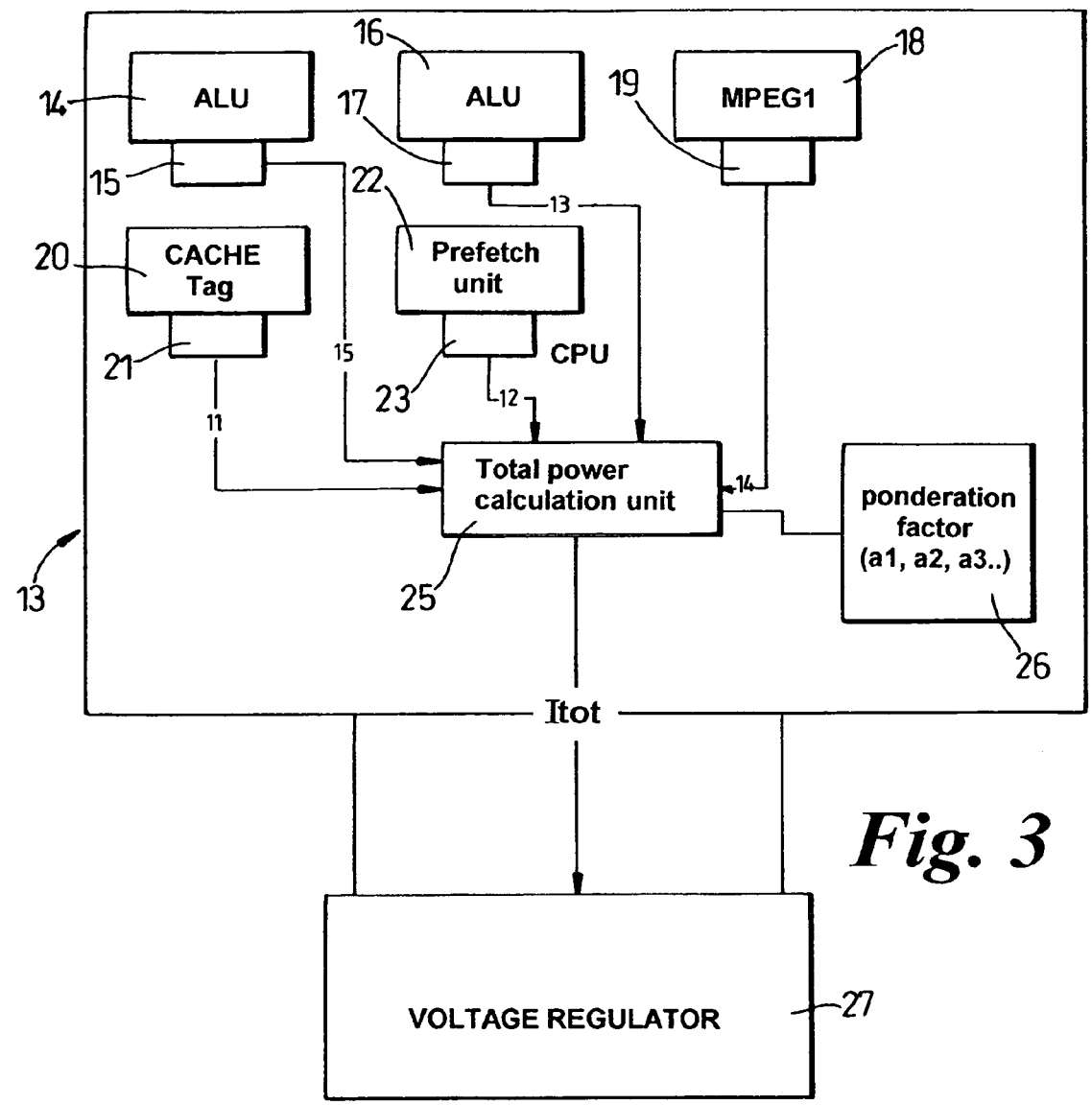
FIG. 3 is a schematic view of an integrated circuit according to the invention, with its voltage regulator.

FIG. 3 is a schematic view of an integrated circuit , with its voltage regulator. In the exemplified embodiment, the circuit is a processor 13, with a number of internal units; FIG. 3 shows two arithmetic and logic units 14 and 16, a MPEG unit 18, a cache tag 20, and a prefetch unit 22. These are but examples of the units that may be comprised in an integrated circuit. According to the invention, the units of the integrated circuit (or only part of these units) are provided with sensors for measuring power consumption at a given time. FIG. 3 shows sensors for each 15, 17, 19, 21 and 23 for respectively sensing power consumption in arithmetic and logic units 14 and 16, MPEG unit 18, cache tag 20, and prefetch unit 22.

The results output by the sensors is provided to a power calculation unit 25. This unit computer a estimate of power consumption for the integrated circuit, based on the results provided by the sensors. Computation of the power consumption for the integrated circuit is discussed below. The computed power consumption is forwarded to the voltage regulator 27 driving the integrated circuit.

Figure 4:
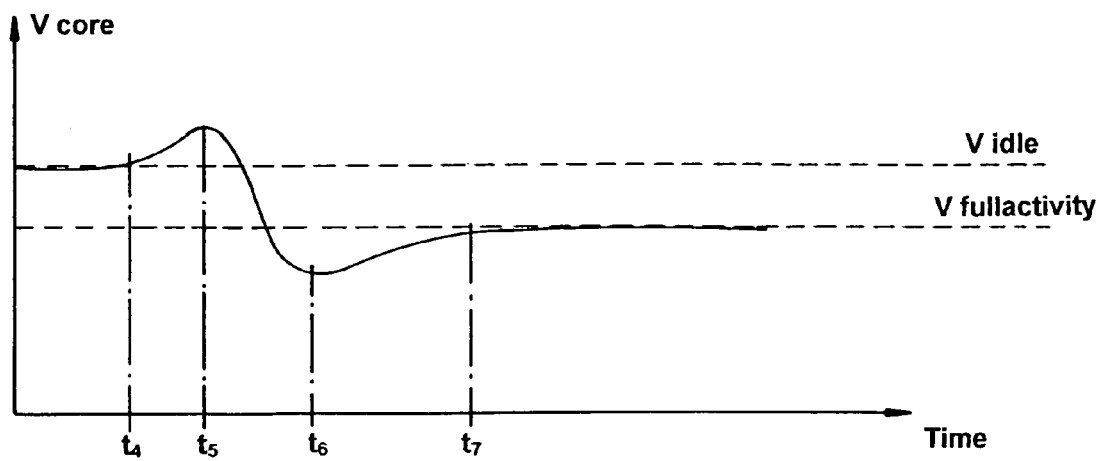
FIG. 4 is a graph of voltage across an integrated circuit according to the invention

Measuring power consumption inside of the integrated circuit, instead of relying on the voltage drop at the voltage regulator makes in possible for the voltage regulator to precompensate the increase of power consumption, as explained in reference to FIG. 4.

FIG. 4 is a graph of voltage across the integrated circuit of FIG. 3. As in the example of FIG. 2, the circuit is idle up to time t1, where it turns to internal full activity. Voltage across the circuit is substantially constant and equal to the idle voltage value Vidle up to time t1; shortly after this time, an increase of power consumption is detected by the sensors of the units of the integrated circuit. Power consumption for the whole integrated circuit is computed by power calculation unit 25 and is transmitted to the voltage regulator even before actual power consumption rises. Typically, the time necessary for computing and transmitting the power consumption is of the order of one or several tenth of microseconds; this time is representative of the computation time in a limited number of transistors of the integrated circuit. The corresponding power surge is likely to occur after a time of the order of several microseconds, as discussed in reference to FIG. 2.

Thus, the voltage regulator may increase the voltage applied to the integrated circuit, before the actual power surge. This can be seen in FIG. 4, inasmuch as voltage across the integrated circuit actually rises above Vidle, after time t1 and up to time t5. The voltage regulator precompensates the power request by the integrated circuit. At this stage, the voltage regulator preferably starts increasing the voltage as soon as a signal from the integrated is received. This may be ensured by simply shorting the voltage regulator upon receiving a signal from the integrated circuit. Thus, expensive changes to the voltage regulator are not required, and it may be sufficient to provide a pair of linear ultra-fast transistors separately from the switching regulator of the prior art. In addition, due to fact that these compensation transistors operate with a very low duty cycle, any thermal effect is not a limiting factor.

At time t5 actually requested by the integrated circuit increases. Voltage across the circuit then drops, up to time t6. This drop of voltage is caused by the sharp increase of the power requested by the integrated circuit.

After time t6, the voltage across the circuit increases again, as the voltage regulator continues provides an increasing voltage, up to time t7, where voltage reaches a stable value around Vfullactivity.

Figure 1:
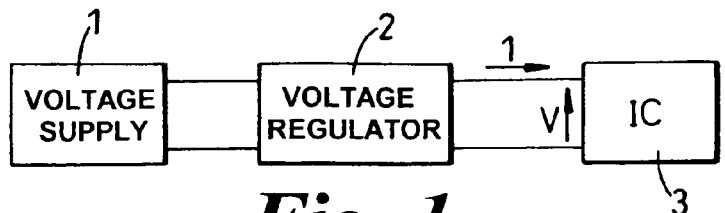
Figure 2:
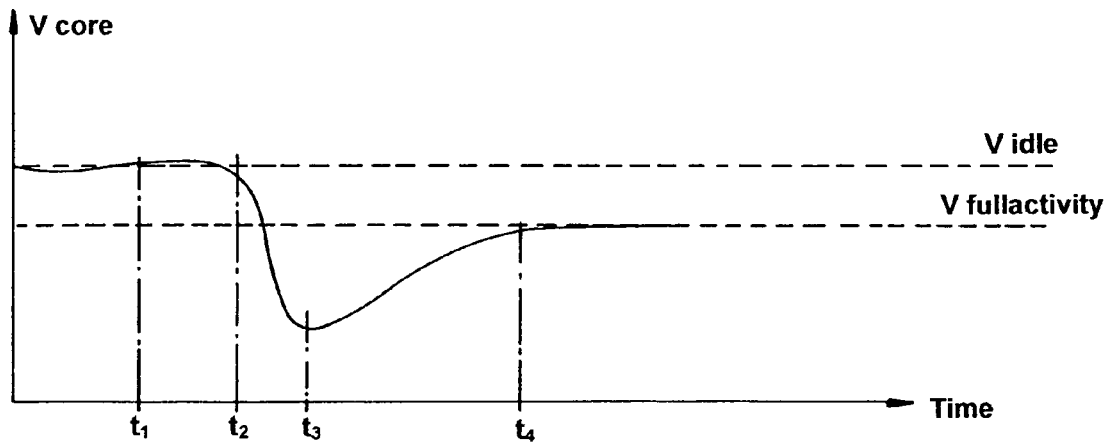
FIG. 2 is a graph of voltage across a prior art integrated circuit.

FIG. 4 shows that transient response is better than in the prior art: the difference between the actual voltage and the target voltages Vidle and Vfullactivity is lower than the one of FIG. 2. Voltage specifications may thus be respected.

The duration between t5 and t7—that is between the beginning of voltage compensation and full voltage compensation—is similar to the duration t4—t3 in the prior art regulator of FIG. 2. This shows that the voltage regulator of FIG. 4 does not need to have a higher switching frequency, or a higher number of phases in order to provide a better regulation of the voltage. Implementation of the invention, contrary to prior art solutions, therefore does not cause any increase in the cost of the regulator.

The invention was discussed in FIG. 4 in reference to an increase of power consumption, the integrated circuit turning from an idle state to a full activity; it applies more generally to any change in power consumption of the integrated circuit, and notably to a drop of power consumption.

Figure 5:
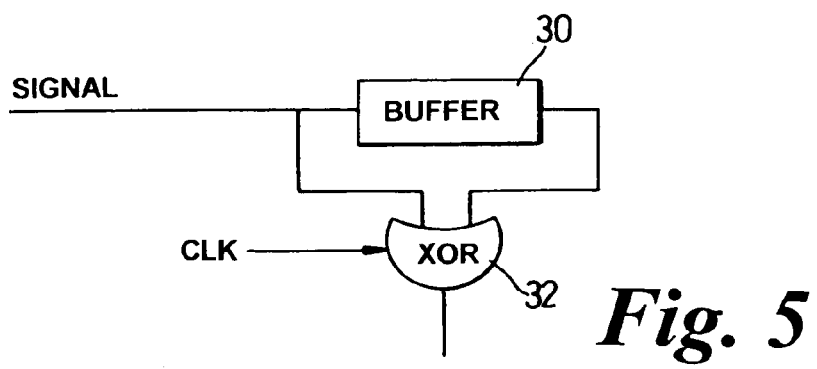
FIG. 5 is a schematic view of a circuit for measuring a change of state.

Sensing and computing of power consumption in the integrated circuit are now discussed. In order to sense power consumption in a unit of the integrated circuit, this embodiment takes advantage of the fact that power consumption in integrated circuits is a function of the number of transistors switching from one state to the other. Power consumption may thus be measured by simply detecting at a given time the number of state changes in the unit. This may be carried out by using a circuit of the type represented in FIG. 5. This figure is a schematic view of a circuit for measuring a change of state of a signal. The signal is derived is applied to a buffer 30, and to one input of an exclusive-OR gate 32. The output of buffer 30 is applied to the other input of the exclusive-OR gate. The exclusive-OR gate is clocked. The output of the exclusive-OR gate is representative of a change of state of the signal. Sensors 15, 17, 19, 21 and 23 may comprise a number of circuits similar to the one of FIG. 5, sensing changes of state in the input or output signals to the respective unit. The outputs of the different exclusive-OR gates are applied to a comparator or adder for determining the total number of changes of states of the input or output signals to the unit. This embodiment relies on the fact that for a unit of the integrated circuits, changes of state of the input or output signals is representative of the number of transistors switching within the unit; the changes of state of the input or output signals may therefore be used for sensing power consumption within the unit.

Of course, any other suitable method may be used measure instantaneous power consumption, for instance power consumption in the unit could also be sensed by a simple line or bus indicating the actual level of activity in the unit.

Computing of power consumption in the power calculation unit 25 is now discussed. As stated above, the power calculation unit receives from the sensors of the units of the integrated circuit the sensed power consumption at a given time; this information is indicated in FIG. 3 as $i1$ to $i5$. Power consumption is computed for the whole circuit based on the sensed power consumption for each unit. The information provided for each of the units may be added. It is however a preferred embodiment of the invention that this information be weighted, so that the total power consumption itot is computed as:

$$itot = a1.i1 + a2.i2 + a3.i3 + a4.i4 + a5.i5$$

where $a1$ to $a5$ are coefficients representative of the weight of each unit in the consumption of the integrated circuit. These coefficients may be fixed at the time the circuit is created, e.g. according to the number of transistors in each unit, or according to tests of actual power consumption of the integrated circuit. Else, as shown in FIG. 2, the coefficients or weights may be stored in the integrated circuit and amended to reflect operation of the circuit. In the case of a microprocessor, the coefficients could be stored in a static RAM 26 of the processor. This allows computation of power consumption to be adapted to the circuit, or to the operation of the circuits, simply by changing the coefficients. Where the invention is used for a microprocessor in a computer, the coefficients could thus be downloaded at boot time for more flexibility. At the initialization time, most of the units inside the cpu such as cache, FPU or MPEG unit are not actually activated, so default values of $\{a1, \ldots a5\}$ coefficients can be used. Computation of power consumption may take into account all units of the integrated circuit, or simply a number of such units that are representative of the operation of the complete circuit.

In the example of FIG. 3, the power computation unit provides a signal itot representative of the power consumption for the whole circuit. It is also possible to provide to the voltage regulator a signal representative of the derivative of this power consumption with respect to time ditot/dt. This derivative is representative of the changes of power consumption, and could provide a more accurate driving of the voltage regulator. It is also possible to add a delay factor to model some specific silicon behaviour.

Although the invention has been explained in reference to preferred embodiments, it should be understood that it is not limited to these embodiments, and that various changes or modifications can be contemplated by the person skilled in the art, without departing from the invention, as determined by the appended claims. For instance, in the description of preferred embodiment, no reference was made to coupling capacitors; such capacitors may of course be used in a system according to the invention, be it only for increasing the reaction time of the voltage regulator.

The invention claimed is:

1. A process for regulating voltage applied by a voltage regulator to an integrated circuit that includes at least two units, comprising:
    measuring instantaneous power consumption inside of the integrated circuit by sensing power consumption in at least two of said units and computing instantaneous power consumption inside of the integrated circuit according to the sensed power consumption in said units; and
    regulating said voltage according to the measured instantaneous power.

2. The process of claim 1, wherein sensing power consumption in a unit comprises detecting state changes in signals output by said unit.

3. The process of claim 1, wherein computing comprises:
    weighting the power consumption sensed in said units; and
    adding the weight power consumption of said units.

4. The process of claim 1, wherein regulating comprises:
    computing the derivative with respect to time of the measured instantaneous power, and
    regulating said voltage according to said computed derivative.

5. The process of claim 2, wherein computing comprises:
    weighting the power consumption sensed in said units; and
    adding the weight power consumption of said units.

6. The process of claim 1, wherein regulating comprises:
    computing the derivative with respect to time of the measured instantaneous power, and
    regulating said voltage according to said computed derivative.

7. The process of claim 2, wherein regulating comprises:
    computing the derivative with respect to time of the measured instantaneous power, and
    regulating said voltage according to said computed derivative.

8. The process of claim 3, wherein regulating comprises:
    computing the derivative with respect to time of the measured instantaneous power, and regulating said voltage according to said computed derivative.

9. An integrated circuit comprising at least one unit provided with a plurality of sensors for measuring power consumption and a power calculation unit for receiving the power consumption measured by each of said sensors and computing a power consumption for the circuit by weighting the power consumption measured by each of said sensors with weights and by adding the weighted power consumption, wherein the weights are stored in said integrated circuit.

10. The circuit of claim 9, wherein said sensor detects state change in signals output by said unit.

11. A combination of a circuit according to claim 9 with a voltage regulator, said voltage regulator being connected to said circuit and receiving the power consumption computed by power calculation unit.

12. The circuit of claim 9, wherein said sensor-detects state change in signals output by said unit.

13. A combination of a circuit according to claim 9 further comprising a voltage regulator, said voltage regulator being connected to said circuit and receiving the power consumption computed by power calculation unit.

14. A combination of a circuit according to claim 10 further comprising a voltage regulator, said voltage regulator being connected to said circuit and receiving the power consumption computed by power calculation unit.

15. In combination, an integrated circuit having at least one sensor for sensing instantaneous power consumption by said integrated circuit with a plurality of sensors inside the integrated circuit and a power calculation unit coupled to the plurality of sensors, and a power supply delivering current within a voltage range to said integrated circuit, the power supply being at least partially responsive to an increase in instantaneous power sensed inside the integrated circuit for increasing voltage supplied thereby before additional power is provided by the power supply to said integrated circuit in response to an increase in demand for current by said integrated circuit, wherein said power calculation unit computes power consumption for the circuit by weighting the power consumption measured by each of said sensors with weights and by adding the weighted power consumption, and the weights are stored in said integrated circuits.

16. A process for regulating a voltage applied by a voltage regulator to an integrated circuit, the voltage regulator being responsive to a drive signal for controlling the voltage, the process comprising:
   measuring instantaneous power consumption inside the integrated circuit;
   in response to an increase in the instantaneous power consumed inside the integrated circuit, supplying power from an internal inductance in the integrated circuit before additional power is provided by the voltage regulator; and
   adjusting the drive signal regulating said voltage according to the measured instantaneous power prior to the integrated circuit demanding additional current from said voltage regulator.

* * * * *